United States Patent [19]

Boncela

[11] 4,134,364
[45] Jan. 16, 1979

[54] DOG EXERCISING DEVICE

[76] Inventor: Eleanor K. Boncela, No. 814 8800 S. Harlem Ave., Bridgeview, Ill. 60455

[21] Appl. No.: 717,599

[22] Filed: Aug. 26, 1976

[51] Int. Cl.² ............................................. A01K 27/00
[52] U.S. Cl. ...................................... 119/29; 119/109; 119/111; 119/120; 280/289 R
[58] Field of Search ................ 119/29, 109, 110, 111, 119/115, 119, 120; 54/71; 278/1, 50, 22; 280/289 R

[56] References Cited

U.S. PATENT DOCUMENTS

| 743,700 | 1/1904 | Carson | 119/29 |
| 1,060,439 | 4/1913 | Duxstad | 119/109 |
| 1,956,937 | 5/1934 | Van Kleek | 119/29 |
| 3,203,399 | 8/1965 | Banks | 119/120 |
| 3,376,855 | 4/1968 | Mescher | 119/29 |
| 3,665,892 | 5/1972 | Kusisto | 119/29 |
| 3,896,769 | 7/1975 | McGehee | 119/119 |

Primary Examiner—Jay N. Eskovitz
Attorney, Agent, or Firm—John J. Kowalik

[57] ABSTRACT

A dog tether for a wheeled vehicle such as a bicycle comprising a stand-off bar which has a clamp at its inner end for attachment to the bicycle frame, and a resilient mounting for the clamp yieldable to take up any sudden jerk by the dog. The outer end of the bar has an adjustable chain or wiffle-tree attachment for respectively tethering one or more dogs.

9 Claims, 8 Drawing Figures

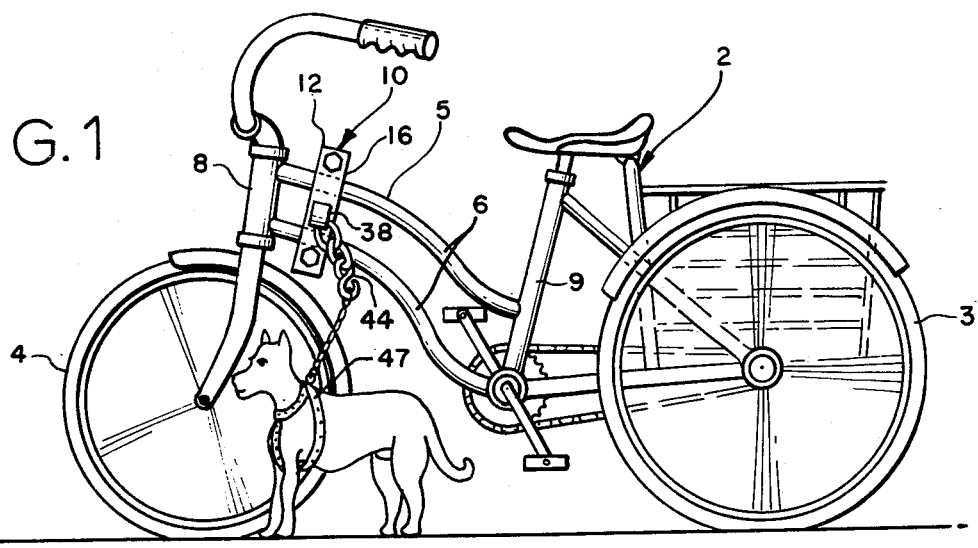
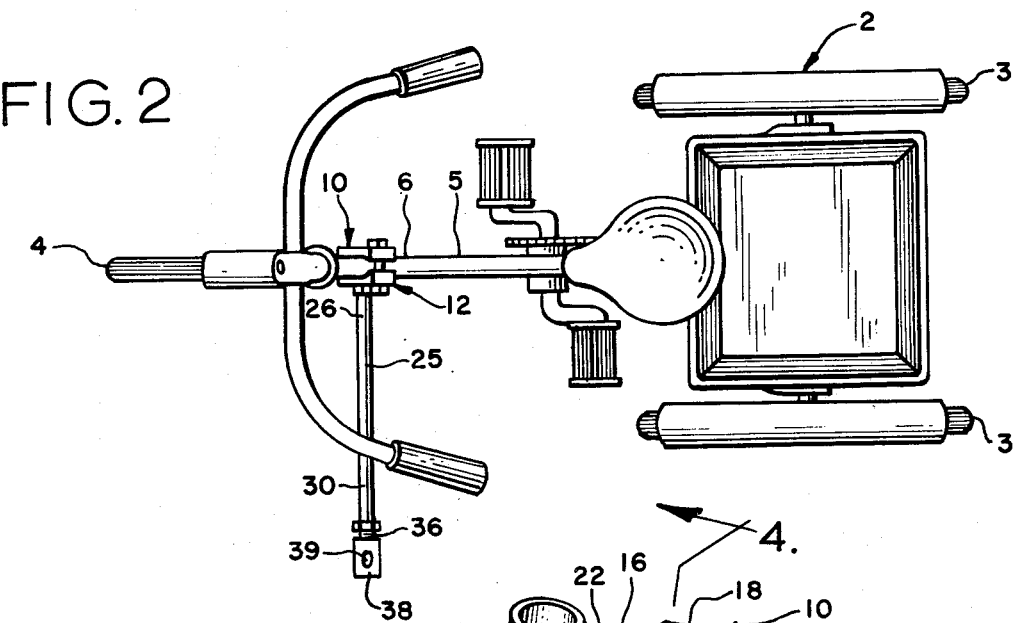
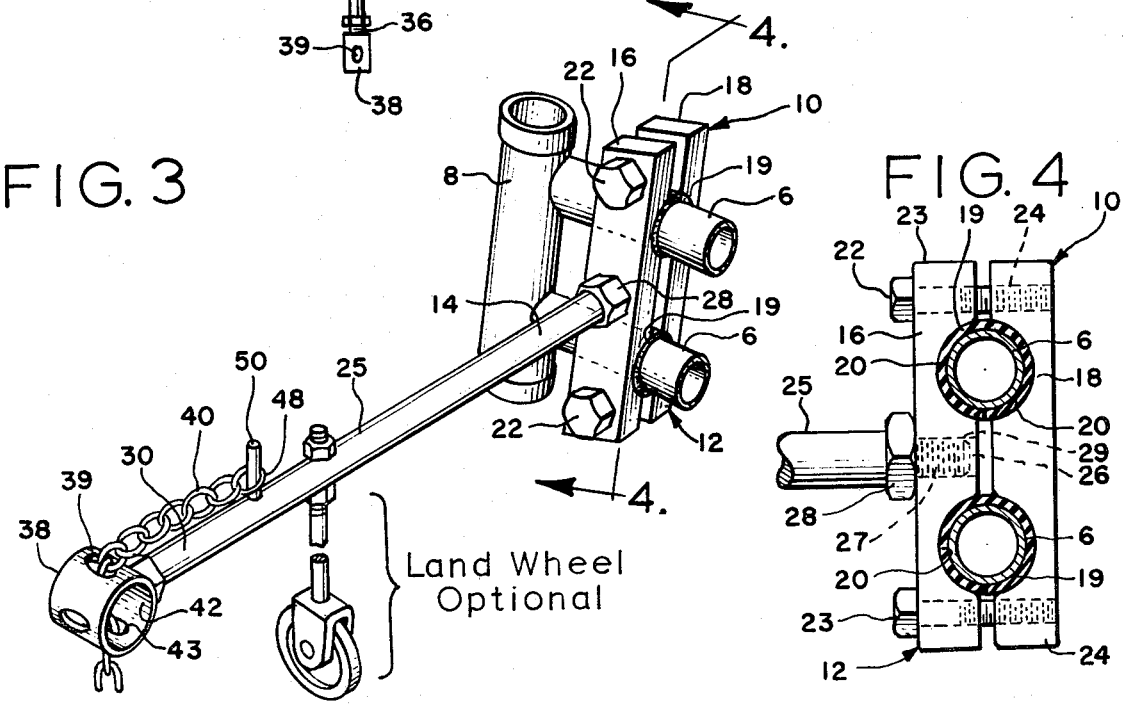

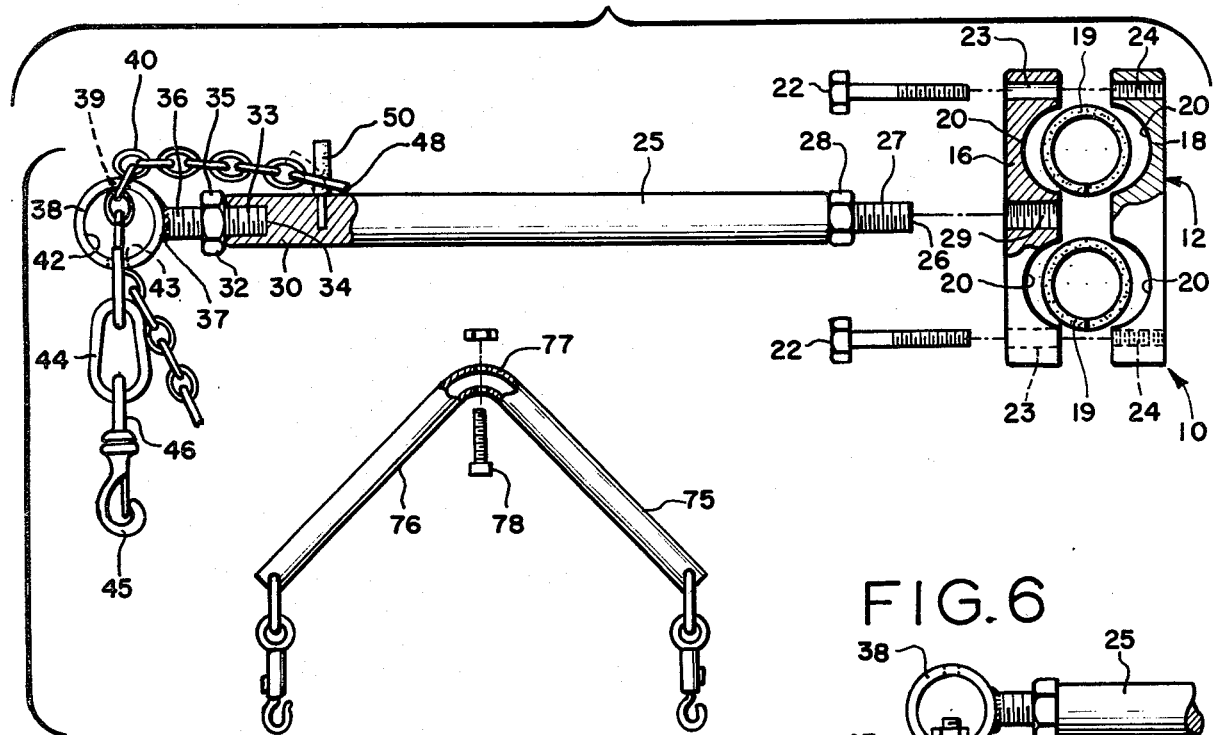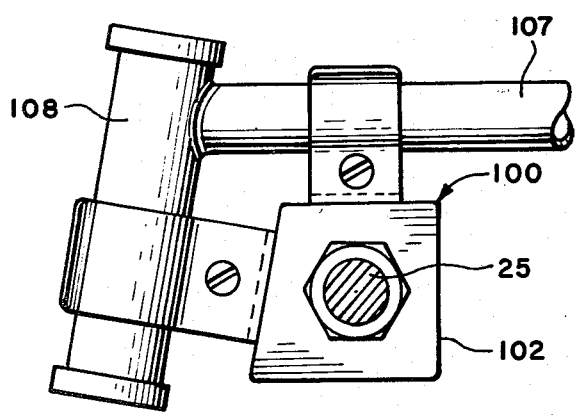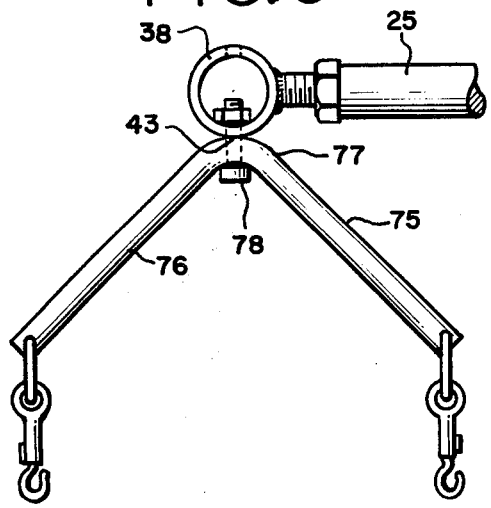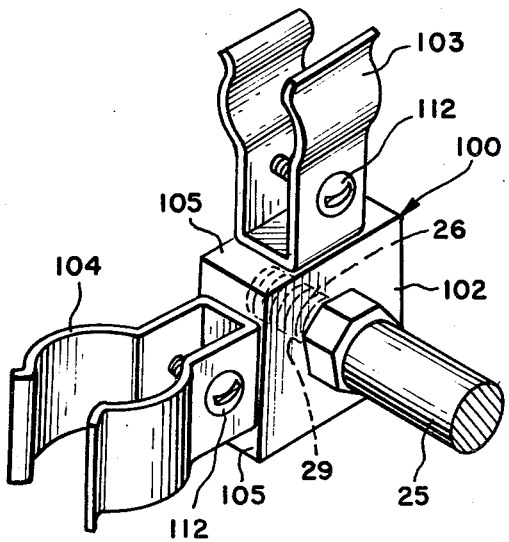

DOG EXERCISING DEVICE

DISCUSSION OF THE INVENTION

This invention is directed to a dog tethering structure which positions the dog alongside the bicycle in a position where the animal is under control of the vehicle and prevents the dog from running into the vehicle or running off sidewise, endangering the rider.

The invention comprehends providing a novel attachment which is easy to apply and remove and which has an adjustable tether for different size animals.

The invention contemplates in addition to a resilient mounting for the stand-off bar, a releasable securing latch which yieldably resists normal tugging by the dog and which releases if the dog should suddenly lurch with great force such as might endanger the bicycle rider.

These and other objects inherent in and encompassed by the invention will become more apparent from the specification and the drawings, wherein:

FIG. 1 is a side elevational view of an adult tricycle with the invention applied thereto;

FIG. 2 is a plan view;

FIG. 3 is an enlarged perspective view of a portion of the frame and bar assembly;

FIG. 4 is a cross-section of FIG. 4 taken substantially on line 4—4 of FIG. 3;

FIG. 5 is an exploded view of the invention showing a dual harness arrangement;

FIG. 6 is a fragmentary side elevational view of the structure of FIG. 5;

FIG. 7 is a perspective view of a mounting assembly for a single bar bicycle; and FIG. 8 is a side elevational view of the structure of FIG. 7 showing its attachment to a single bar bicycle frame.

DESCRIPTION OF FIGS. 1-4

The invention is shown in association with a vehicle generally designated 2 which is preferably an adult tricycle having a pair of spaced rear wheels 3,3, a front steerable wheel 4, and an intervening frame 5 which in the present instance comprises a double bar 6,6 which extends between the fork sleeve 8 and the vertical seat column 9.

The exerciser attachment 10 comprises a clamp assembly 12 at its inner end 14, having a pair of jaw members 16,18 which have opposing arcuate notches 20,20 for complementally embracing the intervening vehicle frame members 6,6. A yieldable elastomeric cushion or sleeves 19,19 are compressed between the frame and the clamp and adapted to yield upon the imposition of an unexpected or sudden pull on the tether. The clamp elements are secured above and below the frame by a pair of bolts 22,22 which are adjustably threaded through openings 23,23 in member 16 into threaded apertures 24,24 in member 18.

A stand-off bar or reach 25 is provided at its inner end 26 with a threaded bolt 27 having a hexagonal head 128, the bolt 27 being threaded into a threaded aperture 29 in the clamp member 16 intermediate its top and bottom ends.

The distal end 30 of the bar also is provided with a double-ended bolt 32 which has an inner end portion 33 threaded into an axial bore 34 in the outer end 30 of the bar. The bolt 32 is provided with a hexagonal wrench engaging nut portion 35 intermediate its ends, and the outer end portion 36 is welded at 37 to the side of a guide sleeve 38, which has a chain guide aperture 39 in its upper side through which extends a link chain 40 which is threaded through the axial bore 42 in the sleeve and extends either through a lower aperture 43 or to the rear thereof with a pendant portion 44, which has a snap hook 45 or other fastener at its free end 46.

The hook is adapted to be snapped on the collar 47 of the animal which is held away from the vehicle by the reach.

The inner end of the chain 40 has one of its links 48 skewed over an upright peg 50 fixed to the reach intermediate its ends. The length of the chain depending below the reach is adjusted for the size of the dog. Preferably the pin may be of resilient material such as spring steel which is adapted to deflect when the chain is pulled inordinately hard, thus providing an automatic tug or pull release. The chain in being drawn through the guide 38 will be somewhat restrained and thus control the dog.

EMBODIMENT OF FIGS. 5 AND 6

In this embodiment parts identical with those previously disclosed are identified with the same reference numerals. In this embodiment a whiffle-tree 75 is provided comprising a V-shaped bar 76 at the apex 77 of which there is provided a bolt and nut assembly 78 which secures the tree to the guide sleeve 38 via bottom aperture 43 therein. The single-tree 75 is provided with chain loops 80,80 at its outer end, which serve as fasteners for a pair of hooks 81,81 to which the collars of two dogs side by side are adapted to be secured.

EMBODIMENT OF FIGS. 7 AND 8

In this embodiment the inner clamp assembly 100 is modified to attach to a boy's bicycle and has a base block 102 to which the bolt 26 is threaded in bore 29. V-shaped upper and forward clamps 103,104 are secured to the top and front sides 105,105 of the square block and are respectively adapted to clamp about the compression bar 107, and front fork sleeve 108 of the bicycle frame. Rubber or elastomer pads (not shown) such as 19,19 are preferably interposed between the clamp jaws 103,104 and the respective frame elements, the jaws being drawn about these frame elements by nuts and bolts 112,112 associated therewith.

What is claimed is:

1. An animal exercising device for attachment to a vehicle such as a bicycle comprising a reach assembly, mounting means at each end of said reach assembly one of which is adaptable for mounting on a vehicle, an animal tether connected to the other of said mounting means of said reach assembly, and at least one of said mounting means comprising overload release means operable to yield upon the imposition of a predetermined load upon the tether, said overload release means comprising means releasable in response to pull on the tether beyond a predetermined load for separating the tether from the reach to prevent overturning of the vehicle.

2. The invention according to claim 1 and said overload means including means for positioning said tether at said one end of the reach assembly with reference to the vehicle, and means for adjusting the length of the tether including said overload means.

3. The invention according to claim 1 and said overload means comprising means for paying out the tether in jerking stepped increments upon release for effecting a yanking action on the tether and thus restraining the animal.

4. The invention according to claim 1 and said mounting means comprising vehicle-engaging yieldable means including pads of elatomeric material accommodating limited deflection of the reach assembly upon the imposition of a load.

5. The invention according to claim 1 wherein said reach assembly comprises telescoping elements for adjusting the length thereof and is flexible to accommodate overloads.

6. The invention according to claim 3 and said overload means comprising means providing an aperture in said reach assembly and said tether comprising a chain having links adapted to run through the aperture and cam over the edges thereof and thereby produce said jerking stepped increments attendant to being paid out upon automatic release of said overload means.

7. A reach assembly for attachment to a vehicle such as a bicycle or tricycle having a frame and front and rear wheels, means at one end of the assembly for clamping to the frame and positioning the reach assembly at one side of the vehicle, intermediate said front and rear wheels generally normal to the frame, tether means at the other end of the assembly for securing an animal thereto, and overload means for automatically releasing said tether means upon the latter being tensioned beyond a certain load.

8. The invention according to claim 7 and means for paying out the tether means in stepped jerk-imposing increments on the tether means for restraining the animal after automatic release of said overload means.

9. The invention according to claim 8 and said means for releasing the tether means from the reach assembly upon the tether means being sharply jerked comprising a resilient pin mounted upon said reach assembly and said tether means comrising a chain having a link sleeved on the pin, said pin being positioned to normally secure the chain to the reach assembly and being deflectible to release said chain during overload.

* * * * *